(12) United States Patent
Das

(10) Patent No.: US 6,418,171 B1
(45) Date of Patent: Jul. 9, 2002

(54) METHOD FOR CODING AND DECODING DIGITAL DATA FOR COMMUNICATION

(76) Inventor: Subhendu Das, 24300 Abbeywood Dr., West Hills, CA (US) 91307

(*) Notice: Subject to any disclaimer, the term of this patent is extended or adjusted under 35 U.S.C. 154(b) by 0 days.

(21) Appl. No.: 09/244,544

(22) Filed: Feb. 3, 1999

(51) Int. Cl.⁷ .................................................. H04B 1/00
(52) U.S. Cl. ...................... 375/259; 375/295; 375/340; 329/311; 332/106
(58) Field of Search ................................. 375/239, 272, 375/295, 302, 303, 322, 324, 334, 259, 340; 332/100, 106; 329/300, 311; 370/527, 529

(56) References Cited

U.S. PATENT DOCUMENTS 5,802,112 A * 9/1998 Ganter ........................ 375/260
5,878,084 A * 3/1999 Myers ........................ 375/271

* cited by examiner

*Primary Examiner*—Amanda T. Le

(57) ABSTRACT

A method is presented for generating symbols, representing digital data, for transmission over a bandwidth limited medium to a receiver. An unique information, such as a function, is assigned to each bit of the digital data. A symbol is created by combining all these functions together to create one function to represent the complete digital data. At the receiving end this composite function is expressed as an equation in terms of the known individual functions and unknown variables representing values of the bits of the digital data. The decoding process involves methods for solving this equation for binary values of the unknown variables.

2 Claims, 2 Drawing Sheets

METHOD FOR CODING AND DECODING DIGITAL DATA FOR COMMUNICATION

BACKGROUND—FIELD OF INVENTION

This invention relates to electronic digital data communication area.

BACKGROUND—DESCRIPTION OF PRIOR ART

Conventional method of transmitting digital data to a receiver is to modulate a sine wave. Sine wave has three parameters: amplitude, frequency, and phase. One of these parameters or a combination of them are modified to represent a digital data. For example to transmit two digital bits using frequency variation the following technique can be used. Two binary bits {0, 1} can be combined in 2**2=4 ways. They are {00, 01, 10, 11}. The pattern 00 can be represented by a sine wave with 100 Hz frequency, 0.1 by 200 Hz, 10 by 300 Hz, and 11 by 400 Hz. If the receiver detects 300 Hz sine wave signal then it knows that the transmitted bit pattern is 10. Observe that to transmit two bits of data at a time four symbols are required, and the receiver will have to search over all of them.

In the above example, each sine wave with the above frequencies is a symbol for each of the digital patterns. To transmit two bits it takes four symbols. Similarly, to transmit 8 bits it will take 28=256 symbols. Therefore to detect an 8-bit pattern the receiver mill have to search 256 signals or symbols to find the transmitted bit pattern. To add one more bits to the transmitted data, for example from 8 bits to 9 bits, the symbol space will increase from 256 to 29=512. Thus the symbol space becomes double for every additional bits. This approach to symbol space puts significant restrictions on the technology for transmitting at a high data rate.

In the conventional approach the information content in the symbol is very low. Only one of the parameters of the sine wave differs from symbol to symbol, and the parameter remains constant over the symbol time. In Quadrature Amplitude Modulation (QAM) method two sine waves are used with two different amplitudes. QAM is also equivalent to a symbol with both amplitude and phase modulation. In QAM only two parameters are different in each symbol.

These are very inefficient use of the symbol time. A lot more information can be transmitted over the same symbol time by properly designing the symbols and still maintaining the same signal bandwidth.

BRIEF SUMMARY OF THE INVENTION

The invention describes a concept of increasing the information content of symbols used to transmit digital data. Each bit of the digital data is represented by an unique function. All these unique functions are added together to create a new function. This new function is the symbol for the complete digital data that will be transmitted to a receiver over a communication medium.

The decoding process essentially is the process of finding binary solutions of a set of linear equations. These linear equations represent the symbol function values in terms of the bit function values. The unknown variables of these equations represent the values of the bits of the digital data.

Coding process described above gives the capability to increase the information content of the symbol. Therefore more bits can be represented by a symbol, and more bits can be transmitted in the same symbol time. By reducing the frequency contents of the bit functions, the bandwidth requirements can also be reduced. This approach of coding and decoding will enable higher communication rate for voice band telephone modems.

In the description several methods for coding and decoding of digital data are presented. These methods are used to illustrate the concept behind the coding/decoding approach presented here. What is invented is not these methods but the concept behind these methods. In coding, the invented concept is to increase the information content of the symbol, by assigning information to each bit of the digital data and then combining these information items to representing the entire digital data. In decoding the concept is to express the combined information in terms of the known bit information and unknown bit variables. The recovery of the binary data is then equivalent to looking for binary solutions of the unknown bit variables.

DETAILED DESCRIPTION OF THE INVENTION

The present invention describes a concept of packing more information in a symbol to represent a binary data. This symbol is then transmitted over a medium to a receiver. Methods are also presented for the receiver to extract information from the received symbol.

In this description, the word symbol will represent an analog electrical signal that describes the binary data and that will be transmitted over a medium to a receiver. The symbol space is the collection of all such symbols. The elements or the components of a symbol are the waveforms or functions or information that are used to create a symbol. Each symbol element is unique and assigns a unique information for the binary bits in the data.

Figure 1:
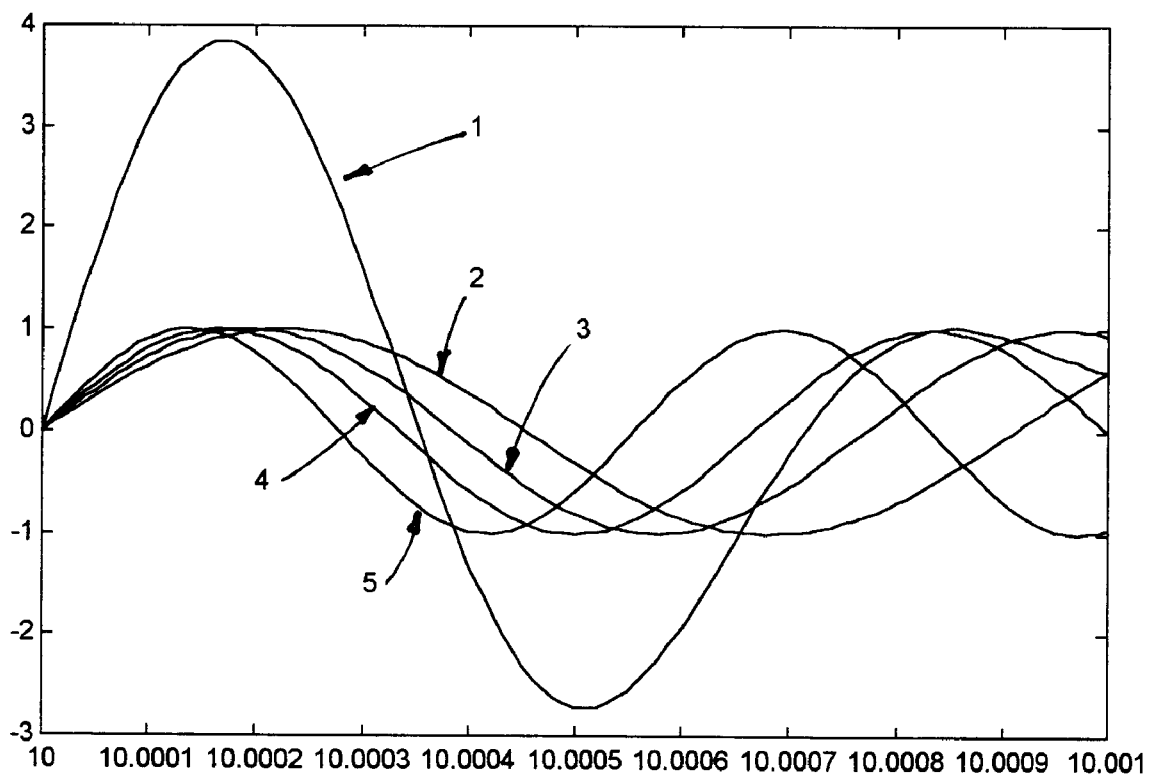
FIG. 1: It shows a symbol that can be transmitted to a receiver. It also shows how the symbol is created for a given binary data by adding different sine wave functions representing the bits of the data. The figure illustrates the concept behind the coding method.

To illustrate the concept, suppose it is required to transmit an 8-bit binary data 10010101. An example for generating a symbol for the above data is described below. Consider FIG. 1 for this description Each bit in the above data is represented by a sine wave function of amplitude one and phase zero but with different frequencies. For example, the right most bit, or the first bit, or the least significant bit (LSB). which is 1 in the above data, is represented by a sine wave of 1100 Hz frequency. That is, it is represented by the function sin(2*pi*1100*t), where the variable t is defined over the interval of the symbol time. This time interval may be of any duration, depending on the transmission data rate. In FIG. 1 this time interval is assumed to be of 1 milliseconds long, from 10.000 to 10.001 seconds. In FIG. 1, this waveform is identified by the number 2.

Bit 2 in the data is zero. Therefore no symbol element is used to represent it. Bit 3 is 1 and is represented by another sine wave function of frequency 1300 Hz. That is, for each bit the frequency increases by 100 Hz in this illustrative example. Therefore the function for bit 3 is sin(2*pi*1300*t). The waveform 3 in FIG. 1 represents this sine function. Similarly all other bits are represented by different frequency sine wave functions. The most significant bit, which is 1 in the data is represented by frequency 1800 Hz and is identified by the number 5 in FIG. 1. In this example zeros of the data do not make any contribution.

However, it is not necessary to neglect the zeros in the data. Information can be assigned to the zeros of the data and added to the symbol. The concept presented for binary 1 bits is equally applicable for binary 0 bits.

The symbol for the example data is created by adding all these waveforms together, point by point in time, over the entire symbol time. This composite waveform, or the symbol, has been identified by number 1 in FIG. 1. This waveform will be transmitted over the medium to a receiver. If required, the symbol magnitude can be normalized to a maximum value of one. For this example the symbol is mathematically represented by Symbol_0=S0=sin(2*pi*1100*t)+sin(2*pi*1300*t)+ sin(2*pi*1500*t) +sin(2*pi*1800*t)

It is seen from the FIG. 1 that the symbol is no longer a simple sine wave. It now has more information and therefore is more complicated.

In the proposed system all the symbol components will be created digitally by a microprocessor software. All the components will be added by the same software to create the final symbol in a digital format. The final digital data for the symbol will be converted into an analog symbol by processing through a DAC (Digital to Analog Converter). This analog signal will be transmitted over the medium to a receiver. The complete process for generating analog symbols, as described above, can also be performed by Field Programmable Gate Arrays (FPGA) or by Application Specific Integrated Circuits (ASIC).

The concept behind this coding approach is to assign an unique information to each bit of the binary data and then combining these information together to create a symbol to represent the complete binary data. This symbol will be transmitted to a receiver over a communication medium. The nature of the information assigned to each bit, and the process of combination should be such that the bit information can be extracted from the combined information at the receiving end. In the above example this bit information is the sine wave functions assigned to each bit and the combined information is the numerical addition of all the individual sine waves. This final waveform is the symbol for the data.

Various generalizations are possible for creating the symbol. All frequencies can be multiple of each other. For example bit 1 can be represented by 1000 Hz, bit 2 by 2000 Hz, bit 3 by 3000 Hz etc. This approach will provide a simpler decoding method. Discrete Fourier Transform (DFT) can be used easily to identify the components of the symbol. But the draw back is that it takes a wider bandwidth to represent the binary data. To represent an 8 bit data it will take, in this case, 7 kHz bandwidth.

The frequencies of the sine waves can be incremented by 1 also. Bit 1 can be represented by 1001 Hz, bit 2 by 1002 Hz, etc. This will require more advanced decoding algorithm. The decoding method for this 1 Hz increment is described later in this invention. FIG. 4 represents the symbol for the example data created by using frequencies with 1 Hz increments. Here again all symbol elements are added together to create the final symbol representing the data.

It is possible to produce the symbol by combining the elements in some other way to pack more information in more efficient way. This invention deals with simple linear combinations only.

It is not necessary to use sine wave functions as components or elements of the symbol. Any orthogonal function can be used as elements. A function f(t) is orthogonal to a function g(t) if their product f(t)*g(t), when integrated over a time interval, produces zero. There are many such functions with many interesting properties that can be used to represent such symbol elements. Orthogonal polynomials are one such class of finite order functions.

One advantage of this coding method is that the receiver will not have to look for symbols in the symbol space. It can look for the elements of the symbol. In the above example it can search for the existence of all the possible known frequencies in the symbol. Therefore it will only look for 8 frequencies. It will not be required to search 2**8=256 symbols. If harmonic frequencies are used any DFT method will decode the symbol. This harmonic coding approach will produce a faster and simpler decoder.

Figure 2:
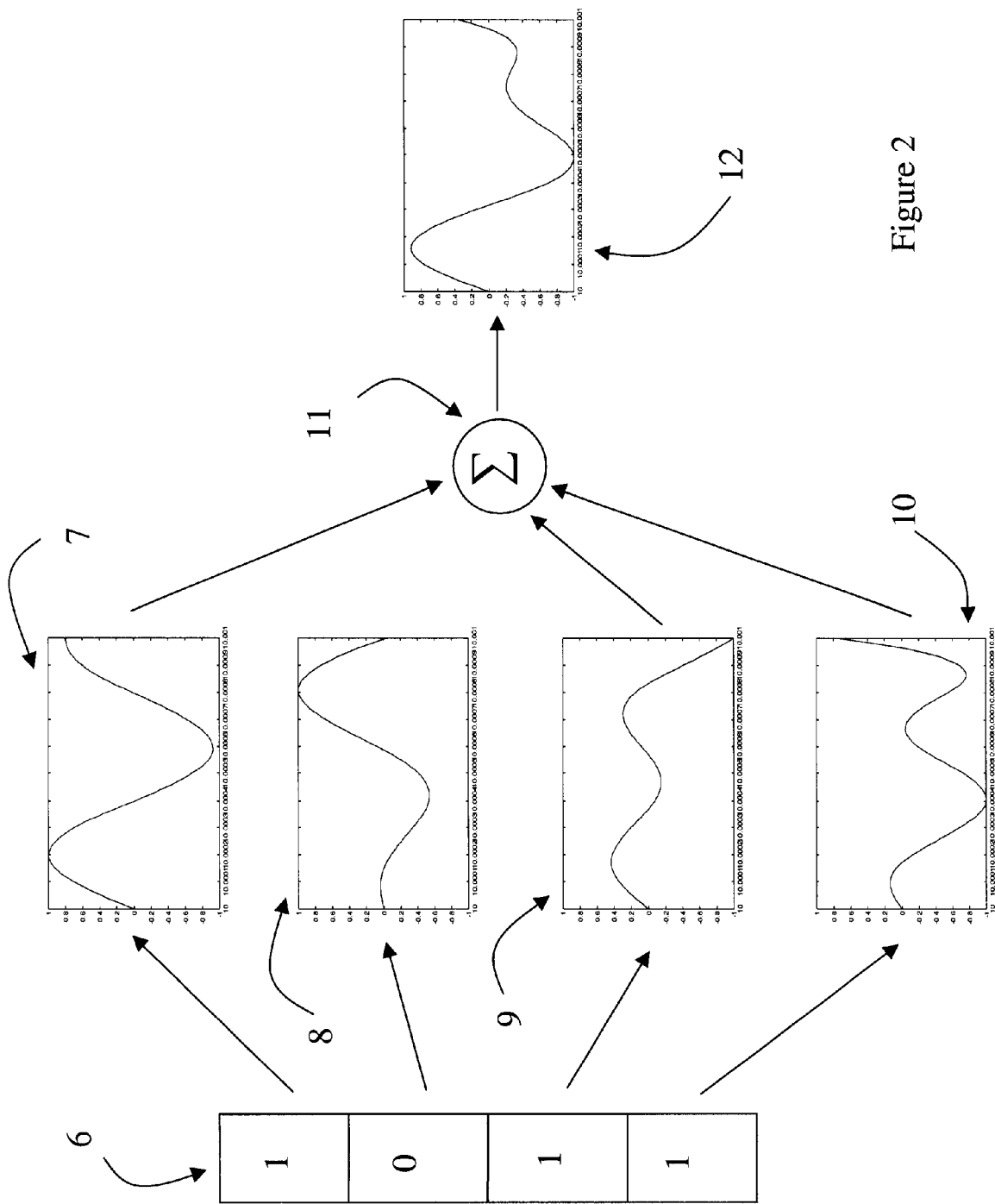
FIG. 2: It shows how information, in this case orthogonal functions, can be assigned to each bit of the data. It also shows how these functions can be combined, in this case added, to produce the symbol for the data.

FIG. 2 shows a coding method using orthogonal functions. The graphs in boxes 7–10 are all orthogonal functions, representing each bit in box 6. Since second bit, from top of box 6 is zero, the corresponding function in box 8 is not added by the accumulator 11, as indicated by the missing arrow between box 8 and summer 11. The graph in box 12 is the sum of graphs in boxes 7, 9, and 10. The graph in box 12 is the symbol for the data in box 6.

Now consider the decoding method. The concept in the decoding process is not to try to identify the symbol out of all possible symbols, as in the conventional method. Instead the objective is to look for the symbol elements present in the symbol. This approach will significantly reduce the decoding effort because the search will be limited to m symbol elements instead of 2**m symbols.

Several methods representing the concept of decoding will be discussed. Consider first the case where the first bit is represent by a sine wave of 1000 Hz frequency, and all other bits by their corresponding harmonics. Therefore the example data will be represented by Symbol_1=S1=sin(2*pi*1000*t)+sin(2*pi*3000*t)+ sin(2*pi*5000*t) +sin(2*pi*8000*t)

Any DFT method can be used to decode the above symbol. A DFT program can be easily implemented by a microprocessor software or by a Field Programmable Gate Array (FPGA) hardware device. This DFT approach is very efficient for decoding symbols created by the coding method invented here. But this approach works best when harmonics are used as symbol elements. If the symbol elements are not harmonically related then the DFT method will be difficult to analyze.

Consider now a case where the symbol elements are sine waves, but with frequencies differing by 1 Hz. Let the LSB of the data be represented by 1001 Hz, bit2 by 1002 Hz etc. Let the composite signal be represented by 10 equally spaced sample points. These sample points are given below.

S2'=[2.3598 3.8108 3.7942
2.3164–0.0534–2.4026–3.8264–3.7766–2.2725 0.1068]

In the above S2' is a row vector and S2, without the prime, is the corresponding column vector. In the same way each component of the symbol, in this case all sine waves with frequencies ranging from 1001 to 1008 can be represented by similar sample values. These sample points are represented as column vectors in the following matrix A.

| 0.5883 | 0.5888 | 0.5893 | 0.5898 | 0.5903 | 0.5908 | 0.5913 | 0.5918 |
|---|---|---|---|---|---|---|---|
| 0.9514 | 0.9518 | 0.9522 | 0.9526 | 0.9530 | 0.9534 | 0.9537 | 0.9541 |
| 0.9505 | 0.9499 | 0.9493 | 0.9487 | 0.9481 | 0.9475 | 0.9469 | 0.9463 |
| 0.5858 | 0.5837 | 0.5817 | 0.5796 | 0.5776 | 0.5755 | 0.5735 | 0.5714 |
| −0.0031 | −0.0063 | −0.0094 | −0.0126 | −0.0157 | −0.0188 | −0.0220 | −0.0251 |
| −0.5908 | −0.5939 | −0.5969 | −0.5999 | −0.6029 | −0.6059 | −0.6089 | −0.6119 |
| −0.9524 | −0.9537 | −0.9551 | −0.9563 | −0.9576 | −0.9589 | −0.9601 | −0.9613 |
| −0.9495 | −0.9479 | −0.9463 | −0.9447 | −0.9430 | −0.9413 | −0.9396 | −0.9379 |
| −0.5832 | −0.5786 | −0.5740 | −0.5693 | −0.5647 | −0.5600 | −0.5553 | −0.5506 |
| 0.0063 | 0.0126 | 0.0188 | 0.0251 | 0.0314 | 0.0377 | 0.0440 | 0.0502 |

In the above matrix the left most column, the first column, represents 10 points of the 1001 Hz sine wave. The second column represents the 10 points of the sine wave with frequency 1002 Hz. Similarly the other columns represent all the 10 points of all other sine waves.

The composite signal S2, in this example of coding, is created by adding columns 1, 3, 5, and 8 of the above matrix A. Therefore the composite signal can be represented by, using matrix notation, as $$b=Ax$$

In the above equation b is the column vector representing the received symbol values, x is the column vector $$x'=[x1\,x2\,x3\,x4\,x5\,x6\,x7\,x8]$$

Each element of x represents one bit value of the transmitted data. For the particular example, under discussion, x1=x3=x5=x8=1, and x2=x4=x6=x7=0. The nonzero elements of x show which columns of the matrix A are combined to create the symbol vector S2 represented by b.

Note that A is a rectangular matrix in this example. It has more number of equations than the number of unknown variables. This is called an over determined system. When the receiver does not know the data, it will solve for x in the above equation. The solution x takes only binary values. The values of xs indicate whether the corresponding column of the matrix A is taken or not. The matrix A is known to the receiver, therefore its inverse will also be known and can be pre-computed. For a rectangular matrix, the inverse is known as Moore-Penrose pseudo-inverse. There are many commercially available software to compute this inverse. One of them is available in the Matlab package. It has a command to find the solution of this matrix inverse using the Moore-Penrose concept. The command for this solution is given by $$x=A\backslash b$$

Using the above software the solution for x, when b is replaced by S2, is obtained as $$x=[1.0001\ -0.0002\ 1.0002\ 0.0001\ 1.0000\ -0.0003\ 0.0003\ 0.999]$$

This is clearly the transmitted data.

Again, the Moore-Penrose pseudo-inverse can be pre-computed and loaded in the microprocessor memory, for the purpose of solving the simultaneous linear equation. The method can also be implemented by an FPGA or an Application Specific Integrated Circuit (ASIC).

It is not necessary to consider an over determined system of equations. It is possible to solve for x even using only 8 samples per element of the symbol space. In that case, the matrix A will be a square matrix, and regular matrix inverse can be used. However more equations will produce better results in case of noisy environment. It is also possible to solve for all the element values even with one single equation.

Consider for example the first sample value or the first equation of the above set of equations. It is repeated here for convenience.

$$2.3598=0.5883x1+0.5888x2+0.5893x3+0.5898x4+0.5903x5+0.5908x6+0.5913x7+0.5918x8$$

The values of xs can be either 0 or 1. In the above all coefficients are greater than 0.5. Therefore only four variables can have non-zero solutions. If five variables are selected then 5*0.5=2.5, which is greater than the left hand side, therefore the solution cannot have five non-zero variables. On the other hand if 3 variables are selected then 3*0.5=1.5, which is way too low compared to the left hand side. Therefore the solution must have four non-zero elements.

Now, rewrite the above equation in the following form:

$$2.3598=0.5882*(x1+x2+x3+x4+x5+x6+x7+x8)+0.0001x1+0.0006x2+0.0011x3+0.0016x4+0.0021x5+0.0026x6+0.0031x7+0.0036x8$$

Since it is known that there are only four non-zero elements, the first part of the right hand side can be only 4*0.5882=2.3528. Therefore the equation reduces to $$0.007=0.0001x1+0.0006x2+0.0011x3+0.0016x4+0.0021x5+0.0026x6+0.0031x7+0.0036x0.0036x8$$

This last equation is equivalent to $$70=x1+6x2+11x3+16x4+21x5+26x6+31x7+36x8$$

The solution problem for the last equation can be restated as follows. Select four numbers out of all the coefficients {1, 6, 11, 16, 21, 26, 31, 36} such that the sum is nearest to 70. It is clear, by inspection, that for the above equation the only possible solution is $$x1=x3=x5=x8=1$$

and $$x2=x4=x6=x7=0$$

Note that the last equation is not exact, but the solution is exact for the original equation.

It is possible to derive several solution methods for the simultaneous linear equations presented for the decoding problem. One other well known and interesting approach is the Branch and Bound (BB) method of 0-1 integer linear programming technique. This approach has some similarity with the Viterbi algorithm used for decoding in the conventional modems. Viterbi algorithm is a dynamic programming approach for sequentially searching the optimal solution among all possible finite solutions. BB method is similar to the above concept.

I claim:

1. A method of coding N bits of digital data, where N is any positive integer, to reduce searches in the corresponding decoder from $2^N$ to N, comprising the steps of:
   a. Selecting N pieces of information
   b. Assigning, one to one, the said each piece of information to each bit of the said N bits of digital data,
   c. Combining the said information pieces to create a new information
   d. Assigning the said new information in step c as the symbol for the said N digital data bits.

2. A method for decoding for the said coding method of claim 1, comprising the steps of:
   a. expressing the said combined information of the digital data in terms of the said individual bit information and unknown variables representing the values of the bits of the digital data, and
   b. solving said expressions for said unknown variables with binary values as solutions.

* * * * *